US006332516B1

(12) United States Patent
Arhab (10) Patent No.: US 6,332,516 B1
(45) Date of Patent: *Dec. 25, 2001

(54) HYDROKINETIC COUPLING DEVICE WITH A BLADE DRIVING MEMBER, PARTICULARLY FOR MOTOR VEHICLES

(75) Inventor: Rabah Arhab, Saint Brice S/Foret (FR)

(73) Assignee: Valeo, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/981,683

(22) PCT Filed: May 6, 1997

(86) PCT No.: PCT/FR97/00806

§ 371 Date: Apr. 13, 2000

§ 102(e) Date: Apr. 13, 2000

(87) PCT Pub. No.: WO97/42433

PCT Pub. Date: Nov. 13, 1997

(30) Foreign Application Priority Data

May 7, 1996 (FR) .................................................. 96 05721

(51) Int. Cl.⁷ ............................. F16H 45/02; F16H 41/24
(52) U.S. Cl. ....................................... 192/3.29; 192/70.18
(58) Field of Search ................................. 192/3.28, 3.29, 192/70.18

(56) References Cited

U.S. PATENT DOCUMENTS

| 5,209,330 | 5/1993 | Macdonald . | |
|---|---|---|---|
| 5,613,582 | * 3/1997 | Jackel | 192/3.29 |
| 5,826,690 | * 10/1998 | Maingaud et al. | 192/70.18 |
| 5,902,498 | * 5/1999 | Mistry et al. | 219/121.64 |
| 6,079,530 | * 6/2000 | Arhab | 192/3.29 |
| 6,123,177 | * 9/2000 | Arhab | 192/3.29 |

FOREIGN PATENT DOCUMENTS

| 4306598 | 9/1994 | (DE) . |
| 2634849 | 2/1990 | (FR) . |
| 94-07058 | 3/1994 | (WO) . |

OTHER PUBLICATIONS

Patent Abstracts of Japan vol. 17, No. 449 (M–1465) & JP 05–104268 Apr. 4, 1993.

* cited by examiner

Primary Examiner—Rodney H. Bonck
(74) Attorney, Agent, or Firm—Liniak, Berenato, Longacre & White

(57) ABSTRACT

A device comprising a generally transversely extending wall (2) with a guide ring (6) securely fastened thereto, an axially movable piston (9) sealingly slidable along the guide ring (6) and rotationally linked to the transverse wall (2) while being axially movable, via tangential resilient blades (40) secured to a driving member (44). The driving member (44) is transparently welded to said wall (2) with a sub-assembly of the member (44), the blades (40) and the piston (9) being formed in advance. Application for motor vehicles.

5 Claims, 6 Drawing Sheets

HYDROKINETIC COUPLING DEVICE WITH A BLADE DRIVING MEMBER, PARTICULARLY FOR MOTOR VEHICLES

BACKGROUND OF THE INVENTION

The present invention relates to hydrokinetic coupling apparatus, especially for motor vehicles, such as is described for example in the document WO-A-94/07058.

In that document, the apparatus includes a generally transversely oriented wall which is arranged to be coupled in rotation to a driving shaft, and which carries, fixed thereto, a central guide ring.

A piston is mounted for axial movement sealingly along the guide ring, and defines, with the transverse wall and with the guide ring, a variable volume chamber which is bounded on the outside by a disc, together with friction liners which are adapted to be gripped, respectively, between the piston and the disc and between the disc and the transverse wall.

Each friction liner is fixed to one of the elements consisting of the disc, the piston and transverse wall between which it is adapted to be gripped.

It has previously been proposed, in the document FR-A-2 634 849, to couple the piston in rotation to the said axially fixed transverse wall, with axial mobility being obtained by means of tangentially oriented tongues which are fixed to a driving member disposed in the variable volume chamber.

In practice, this driving member is in the form of a disc which is fixed by a splined coupling to the guide ring carried centrally by, and fixed to, the said transverse wall.

As a result, the fitting of the guide ring on the transverse wall is not as easy as might be desired, because the said guide ring is equipped in advance with the disc carrying the tangential tongues coupled to the piston.

In addition, the solution is neither simple nor inexpensive, because of the splined mounting of the disc on the guide ring.

In addition, the feed to the variable volume chamber has to be obtained with the aid of channels which are formed in a known way in the said ring, and the said channels have to be arranged in such a way as to have regard to the presence of the disc, the nature of this arrangement being such as to increase the axial distance between the piston and the transverse wall.

An object of the present invention is to reduce these disadvantages in a simple and inexpensive way, while continuing to benefit from easy sliding of the piston along the guide ring and from the provision of a sub-assembly consisting of the driving member, the tangential tongues and the piston.

SUMMARY OF THE INVENTION

In accordance with the invention, a hydrokinetic coupling apparatus with a lockup clutch, of the type described above, is characterised in that the driving member for the tongues is fixed by laser transparency welding to the said transverse wall, and in that the driving member is included in advance in a sub-assembly which also comprises the tangential tongues and the piston.

Thanks to the invention, the guide ring is simplified, because no splined coupling need be provided, since the driving member is secured to the transverse wall by welding.

Another result of the invention is that it is possible to locate the feed channels for the variable volume chamber in a desired way because no disc is fixed on the guide ring.

This also enables the axial dimension between the transverse wall and the piston to be reduced. In addition, advantage is taken of the configuration of the axially fixed transverse wall. In this connection, this wall has, in its middle part, a portion which projects axially away from the piston with respect to the central part of the said wall. It is in this middle wall portion that the driving member is fitted, which enables axial size to be reduced.

The driving member, preassembled in a sub-assembly which also consists of the tongues and the piston, can be positioned with respect to the transverse wall prior to the welding operation, with the aid of, for example, a removable jig for centering the piston with respect to the transverse wall. This jig may for example include a centering piece which is fitted into the bore of the central portion of the transverse wall, centering the piston externally.

By virtue of the welding operation, it is thus possible to reduce the tolerances in the kinematic chain that goes from the driving member to the piston, while having the above mentioned sub-assembly. The sub-assembly enables simple fastening means to be used, such as rivets, screws or bolts. The sub-assembly enables the piston to be quickly fitted on the transverse wall.

Fitting of the guide ring can be carried out as a final step.

Thanks to all these arrangements, satisfactory sliding of the piston along the guide ring, that is to say without any risk of jamming, can be guaranteed.

The following description illustrates the invention with reference to the attached drawings, in which:

DESCRIPTION OF THE PREFERRED EMBODIMENT

As is known, and as is described for example in the document WO-A-94/07058, to which reference can be made for more detail, a hydrokinetic coupling apparatus includes a torque converter and a lockup clutch 1, arranged in a common sealed housing which is filled with oil and which constitutes a casing.

This casing, which in the present case is of metal, constitutes a driving element and is adapted to be coupled in rotation to a driving shaft, namely the crankshaft of the internal combustion engine in the case of an application to a motor vehicle.

The casing, which is annular in form, consists of two half shells which are arranged facing each other and which are secured together sealingly at their outer periphery, typically by welding.

The first half shell 2, 3 is adapted to be coupled in rotation to the driving shaft, and includes a generally transversely oriented annular wall 2 which is extended at its outer periphery by a generally axially oriented cylindrical wall 3.

The second half shell, which is omitted for simplicity, as is the reaction wheel of the converter, is so configured as to define an impulse wheel having vanes which are fixed with respect of the internal face of that half shell. These vanes lie facing towards the vanes of a turbine wheel 4, which is secured by riveting or welding to a damper plate integral with a hub 5, the latter being splined internally for coupling it in rotation to a driven shaft, namely the input shaft of the gearbox in the case of an application to a motor vehicle. This shaft is hollow internally, so as to define a channel for access of oil to a guide ring 6, which is fitted axially between the hub 5 and the transverse wall 2.

More precisely, the said guide ring 6 has in its centre a centering nose 7 which projects axially and which is secured centrally by a weld, the band of weld metal of which is shown solid, to the wall 2, which for this purpose includes a central, axially oriented sleeve 50 facing outwardly, into which the centering nose 7 penetrates, with the outer periphery of the nose 7 being in intimate contact with the inner periphery of the sleeve 50. The guide ring 60 also has a transversely oriented collar portion 8. The ring 6 is thus shouldered, and is in contact through its collar portion 8, after being secured by welding, with the internal face of the wall 2 that faces towards the hub 5.

A washer 80 of synthetic material is interposed between the hub 5 and the guide ring 6. This washer 80 is carried by the hub 5 by means of pins which are not given a reference numeral.

A piston 9 is mounted for axial sliding movement along the annular outer periphery of the collar portion 8, which is formed with a groove in which an annular sealing ring 29 is fitted. The piston 9 has a central, axially oriented sleeve which faces towards the wall 2 for sliding movement along the outer periphery of the collar portion 8. The piston 9 defines, with the ring 6, the wall 2 and a disc 10, which carries friction liners 11 secured on each of the faces of the disc, for example by adhesive bonding, a variable volume chamber 30 which is fed through the guide ring 6, which for that purpose has holes, not given a reference numeral, which are fed through the channel in the above mentioned driven shaft. In this example, these holes are formed in the collar portion 8, and have inclined portions which are open into a central blind hole formed in the guide ring 6. The disc 10 is fitted at the outer periphery of the piston 9, and has at its outer periphery, radially outside the piston 9, lugs having an axially oriented portion, each of which penetrates into a notch formed at the outer periphery of a guide ring 12. The disc 10 is thus coupled in rotation, while being axially moveable, to the guide ring 12 through a coupling 13 of the tenon and mortice type consisting of lugs and notches.

The notches are formed in a transverse portion 14 of the guide ring 12. This transverse portion 14 is extended by an axially annular portion 15 which serves to hold, radially outwardly, coil springs 16 which are retained internally by an annular retaining portion 17 of a damper plate 18, which is extended inwardly by a plate portion 19, secured by riveting to the flange of the hub 5 at the same time as the turbine wheel 4, which for this purpose is provided with lugs (not given a reference numeral) at its inner periphery.

In another version, this fastening may be obtained by welding. The plate portion 19 has a set of holes (not given a reference numeral), through which oil can flow between the piston 9 and the wheel 4.

The damper plate 18 has abutment portions 20 for the circumferential ends of the springs 16. The portions 20 are formed in sinuous engagement slots which extend from the inner periphery to the outer periphery of the retaining portion 17 of the damper plate 18. This portion 17 is in the form of a half shell, and is offset axially with respect to the portions 14,15 of the guide ring 12, which also constitutes a half shell. The guide ring 12 is provided, at the level of its axial portion 15, with radially inwardly directed integral deformations 21 for engagement by the ends of the springs 16. For more detail, reference should be made to the document WO-A-94/07058, and in particular to FIGS. 24 to 28 of the latter.

It will be noted that, apart from the seal 29 and the liners 11, the components of the hydrokinetic apparatus are of metal, usually of press-formed sheet, and that the damper plate 18 carries the guide ring 12, with the annular portion 15 firstly surrounding an axially oriented flange formed at the outer periphery of the retaining portion 17, and, secondly, having lugs which extend radially inwardly for cooperation with the free end of said flange.

Thus the lockup clutch 1 includes a torsion damper 23 which is fitted mostly between the turbine wheel 4 and the wall 2 of the outer periphery of the first shell, with an input part 12 disposed radially outwardly of the piston 9 and liners 11, and consisting of the guide ring 12 in the form of the half shell 14, 15, together with the coil springs 16, and an output part consisting of the damper plate 18, which is again in the form of a half shell, at its outer periphery.

The output part 18 is coupled in rotation to the turbine wheel 4, and more precisely to the hub 5 of the latter, while the input part 12 is coupled in rotation to the disc 10, projecting radially with respect to the piston 9. The input part 12 is therefore coupled disengagably to the driving shaft via the disc 10 and the liners 11, the said disc 10, with its liners 11, being adapted to be gripped disengagably between the piston 9 and the wall 2, which constitutes a counter-piston. The disc 10 is thus coupled elastically to the hub 5 and to the wheel 4.

Figure 4:
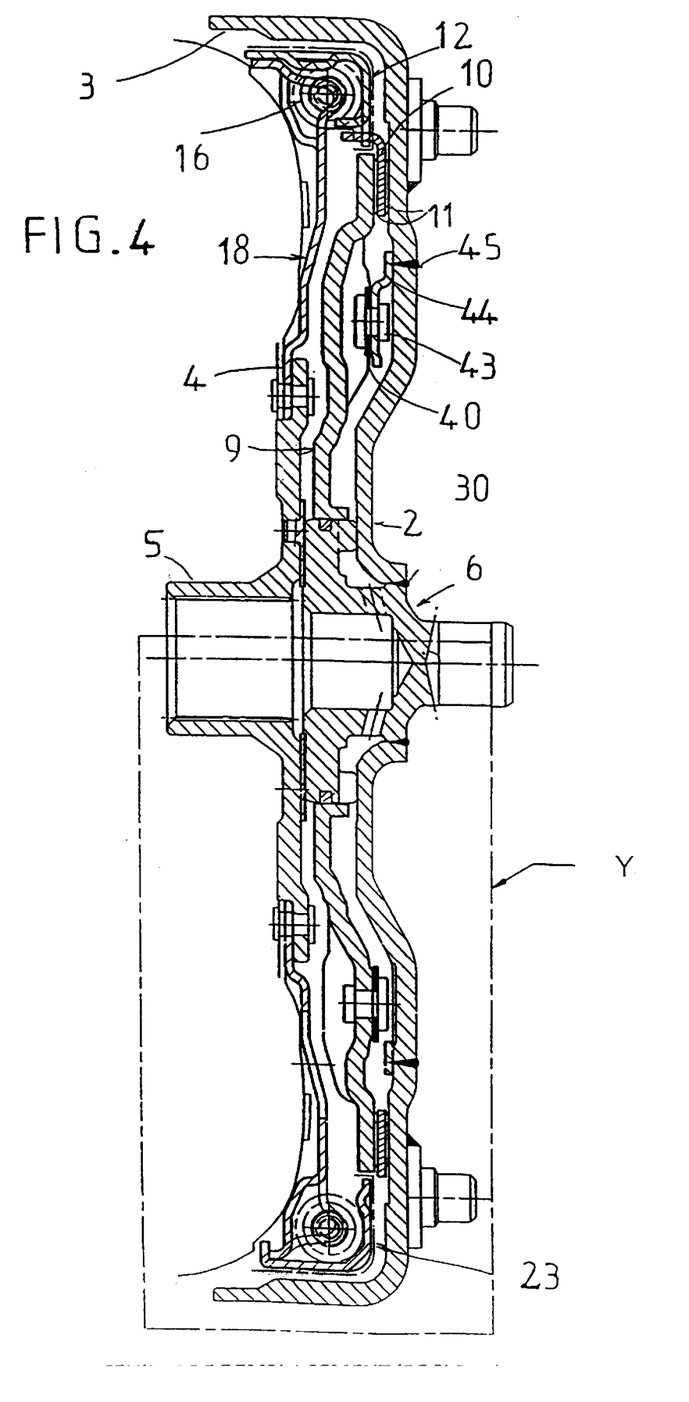
FIG. 4 is a view similar to FIG. 3, for the engaged position of the lockup clutch.
Figure 6:
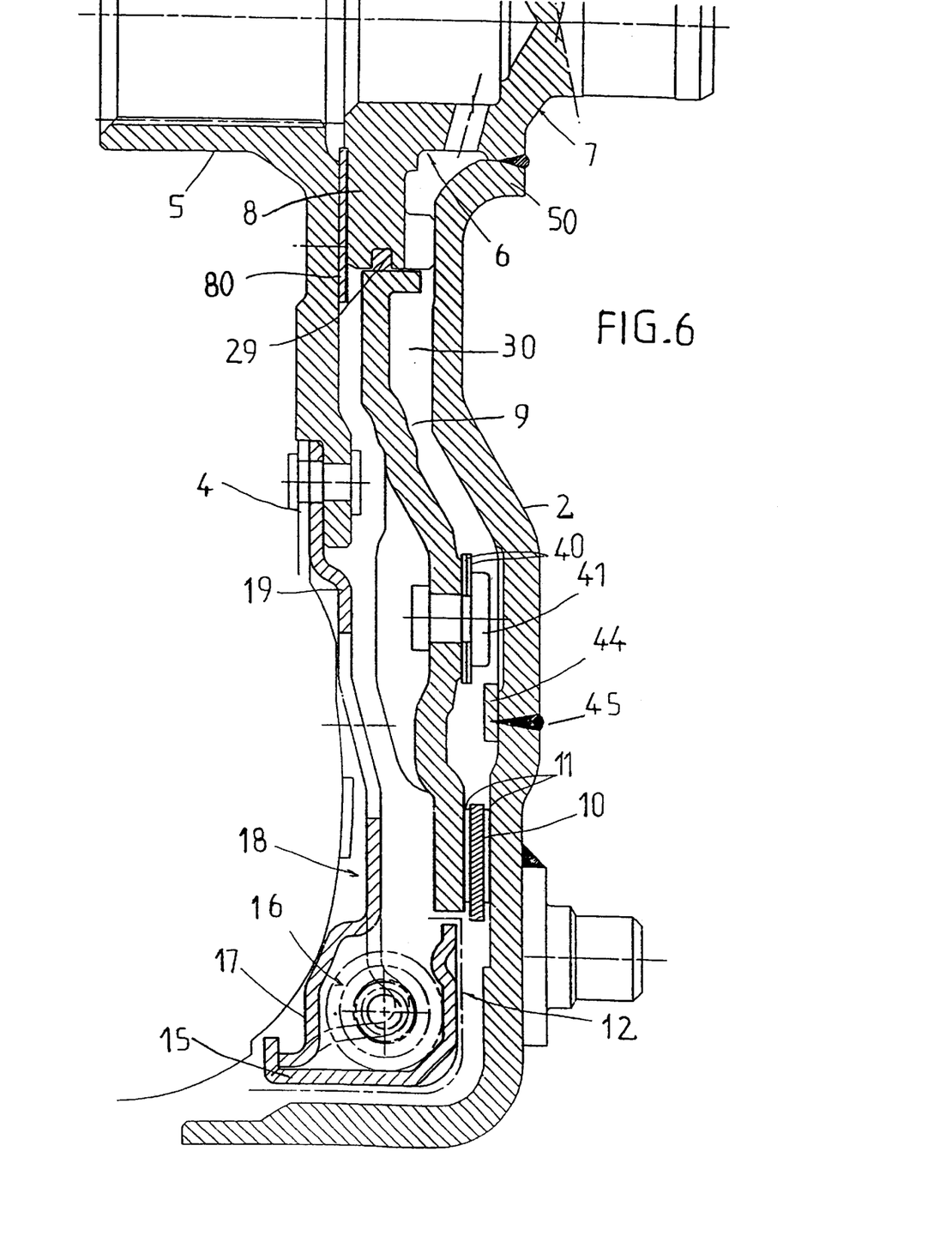

More precisely, the turbine wheel 4 is driven in rotation by the impulse wheel, by virtue of the circulation of fluid contained in the sealed housing or casing, and after the vehicle has been started, in order to avoid sliding effects between the turbine wheel and the impulse wheel, the lockup clutch (FIGS. 4 and 6) enables the driven shaft to be fixed (or coupled) directly to the driving shaft, by gripping of the friction liners 11 and disc 10 between the piston 9 and the (counter-piston 2, with the driven shaft being driven directly by the shell 1.

Figure 1:
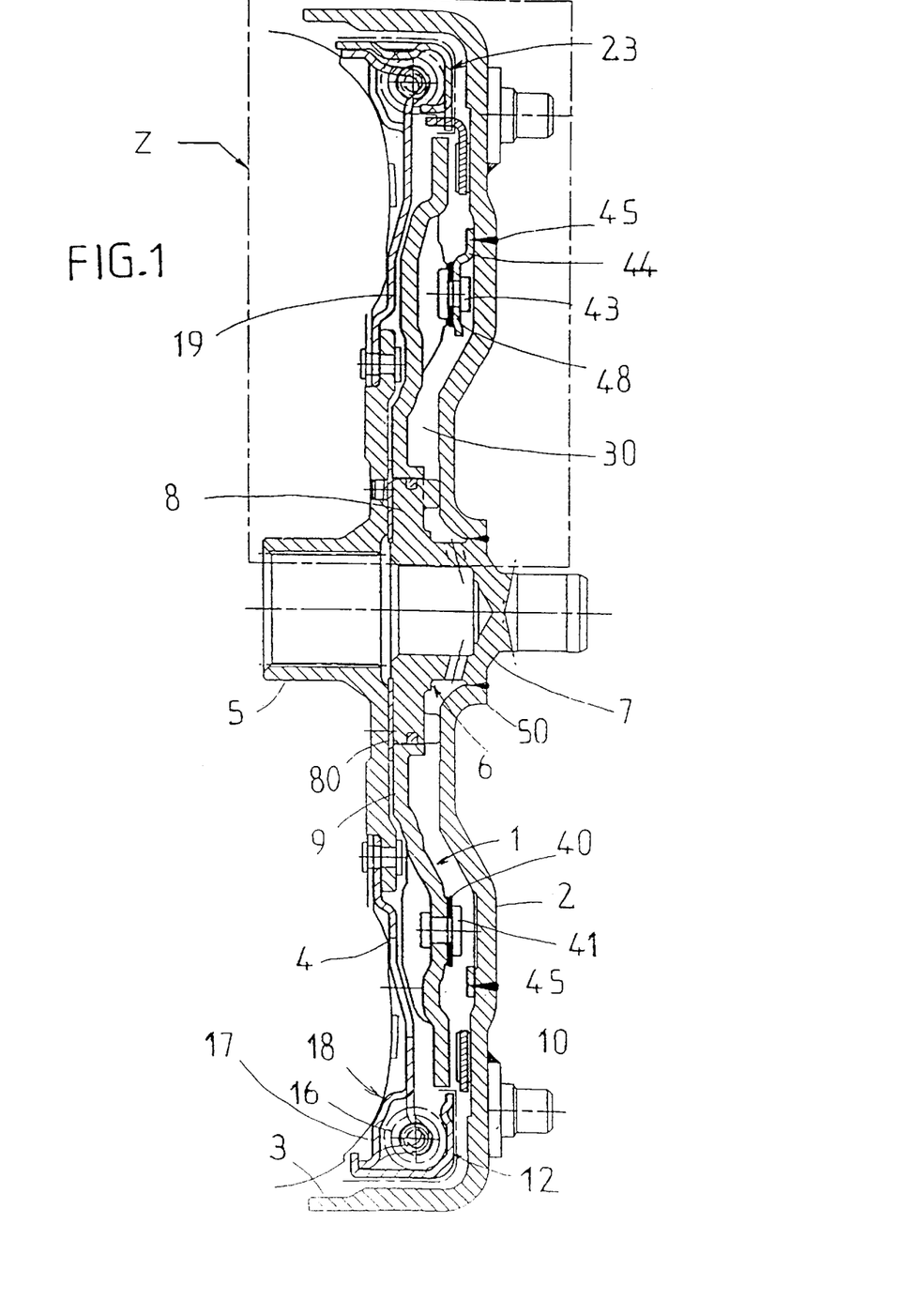
FIG. 1 is a view, in partial axial cross section taken on the line A—A in FIG. 2, of a hydrokinetic coupling device in accordance with the invention, with the lockup clutch being in its disengaged position.
Figure 5:
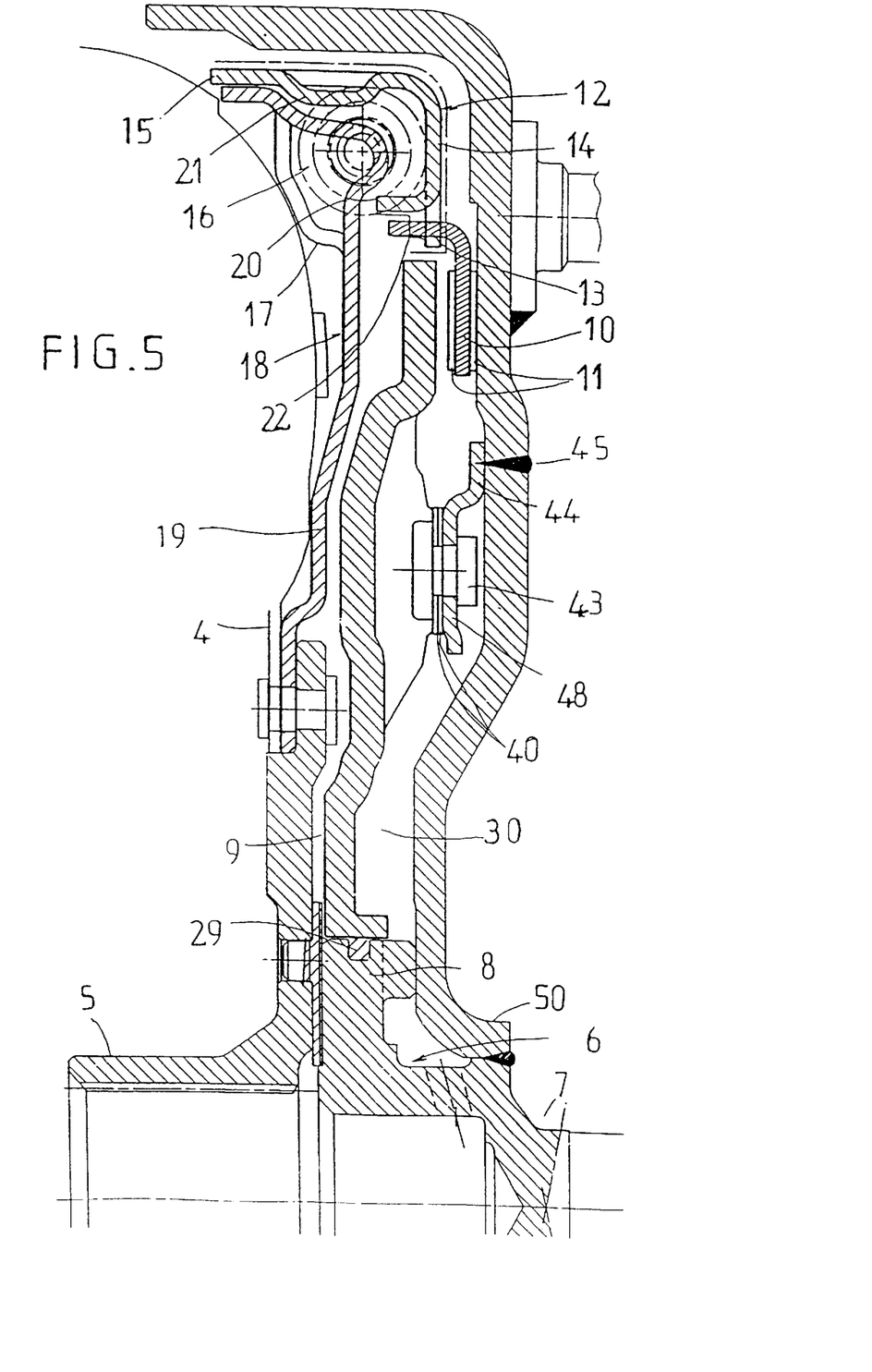
FIGS. 5 and 6 are views on an enlarged scale of the parts indicated by the boxes Z and Y respectively in FIGS. 1 and 4.

In order to disengage the clutch 1 (disengagement of which is shown in FIGS. 1 and 5), a pressure is transmitted into the chamber 30 through the channel in the driven shaft, the blind hole in the guide ring 6, and the holes of the latter. This chamber 30 is sealed by the seal 29 carried by the collar portion 8.

In the position in which the clutch 1 is engaged or coupled (with the liners 11 being gripped as in FIGS. 4 and 6), the said chamber 30 is depressurised. This chamber 30 is accordingly bounded on the outside by the disc 10 and the liners 11, with the piston 9 and the wall 2 each having at its outer periphery a flat (transverse) friction face for the liners 11.

In this example, the piston 9 is coupled in rotation to the wall 2 of the first shell by means of tangentially oriented elastic tongues 40 which are spaced apart circumferentially at regular intervals, while being in this example (FIG. 2) four sets of tongues. These tongues 40 enable the piston 9 to move axially with respect to the wall 2. The tongues are attached to the transverse wall 2 through an interposed annular member 44, which is of metal in this example and which is fixed to the wall 2, in accordance with the invention, by laser transparency welding at 45. The annular member 44 has, from place to place on its inner periphery, lugs 48 which are offset axially with respect to its main portion, by which it is fastened to the wall 2. The tongues 40, which in this example are arranged in a stack of two tongues, are fixed at one of their ends to the lugs 48 by means of rivets 43. In another version, the rivets may be replaced by screws or bolts.

The member 44 therefore carries the tongues and constitutes a member for driving the latter in the manner to be described below.

For attachment of the other end of the tongues 40 to the piston 9, rivets 41 are again used, or, in another version, screws or bolts. In this example, in accordance with one feature of the invention, a sub-assembly is constructed in advance, consisting of the driving member 44, the tongues 40 and the piston 9. This reduces the assembly time for fitting the member 44 on the wall 2.

The tongues 40 lie within the space that extends radially between the friction liner 11 and the axis of the assembly, that it to say within the chamber 30.

The tongues 40 therefore extend axially between the wall 2 and the piston 9. The lengthwise direction of the said tongues 40 is generally tangential with respect to a circumference of the apparatus.

It will be noted that advantage is taken of the construction of the transverse wall 2, which leaves open an enlarged space for the variable volume chamber 30 in its middle region.

In this connection, as can be seen in the drawings, a larger gap exists between the middle part of the wall 2 and the middle portion of the piston, in facing relationship with it, than between the inner periphery of the piston 9 and the central portion of the wall 2.

The assembly operation is as follows:

First of all, the tongues 40 are attached to the axially fixed wall 2.

For this purpose, a sub-assembly, comprising the driving member 44 and the tongues 40, attached by means of the rivets 43 on the lugs 48 of the said member 44, and the piston fixed to the tongues 40 by means of the rivets 41, is constructed in advance.

This sub-assembly is then secured to the wall 2 by welding at 45.

Preferably, in accordance with the invention, this welding is of the transparency type performed with a laser, that is to say without any addition of material. In the drawings, welding is carried out from the side of the transverse wall 2 which is opposed to the piston 9, that is to say from the outside. The weld extends through the thickness of the wall 2 and partially through the thickness of the driving member 44.

Figure 2:
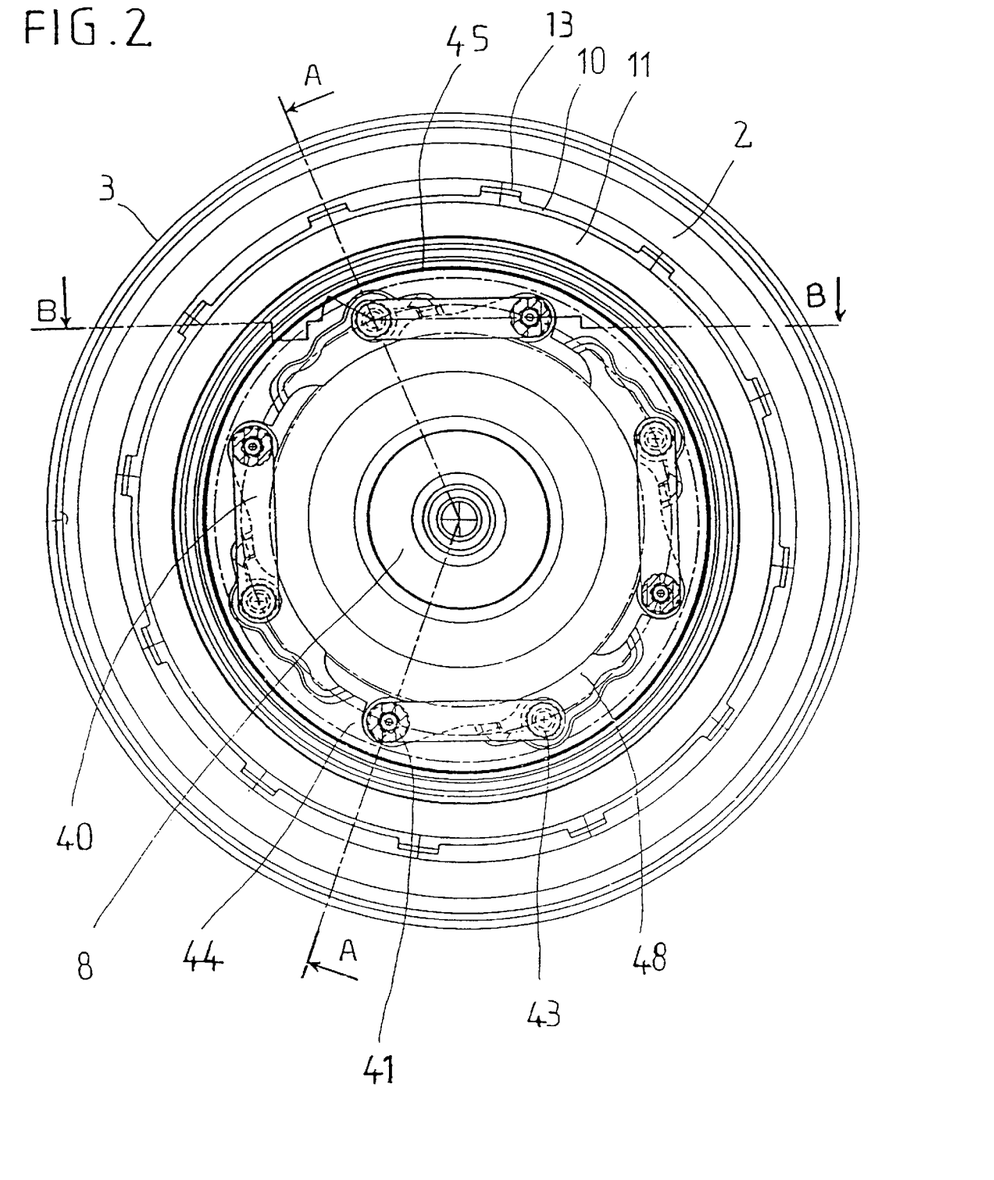
FIG. 2 is a view in the direction of the arrow 2 in FIG. 1, shown partly cut away and showing the tongues, with the turbine wheel, the hub, the piston and the torsion damper of the apparatus all being omitted.
Figure 3:
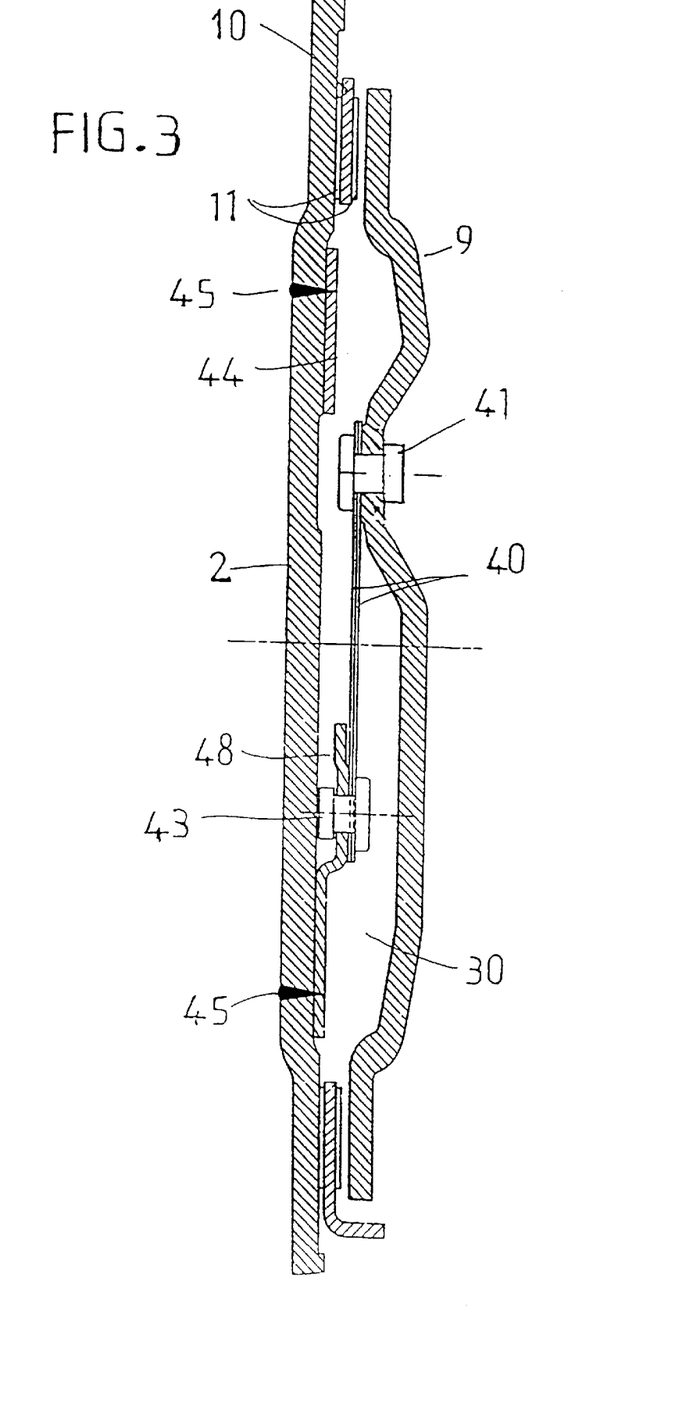
FIG. 3 is a view in the direction of the line B—B in FIG. 2.

This welding produces a continuous weld band, as is best seen at 45 in FIG. 2.

In the welding operation, a jig with a removable centering piece is used, to enable the driving member 44 for the tongues 40 to be properly positioned with respect to the wall 2 before the welding operation.

For example, advantage is taken of the central sleeve 50 of the wall 2. The centering piece of the jig is then engaged in the sleeve 50, and is configured externally so as to centre the piston 9. The centering piece includes, for example, a collar at its outer periphery, for engagement and centering of the central sleeve of the piston 9, the internal bore of which is thus in intimate contact with the collar portion.

Thus, with the aid of the centering piece, the member 44 is precisely positioned with respect to the wall 2, after which the welding operation is carried out, and finally the said jig is removed.

By virtue of the centering affect obtained in this way, the said piston 9 will subsequently be in correct sliding engagement on the guide ring 6.

Finally, the centering piece is withdrawn, the guide ring 6, equipped with its seal 29, is engaged in the piston 9 (i.e. in the internal bore of the sleeve of the piston 9), and finally the ring 6 is welded on the end of the sleeve 50.

This welding is carried out for example by laser welding, and gives rise to a weld ring.

As will have been understood, the invention reduces the tolerances that exist between the driving member 44 and the piston, so that the latter slides correctly on the ring 6, which is accordingly of simple form, being fitted for example as a final step.

The present invention is of course not limited to the embodiment described. In particular, the coupling of the piston 9 in rotation with the first half shell 2,3 may be obtained by means of the tongues 40 integral with the driving member 44, as is described for example in FIG. 7 of the document FR-A-27 26 620, so that the presence of the rivets 43 is not necessary.

This arrangement also enables the tolerances to be reduced.

In general terms, the liners 11 are gripped directly or indirectly between the piston and the wall 2.

In another version, the friction liners 11, instead of being secured by adhesive bonding or brazing of the disc 10, may be secured respectively to the piston 9 and to the wall 2, for example by adhesive bonding or brazing, in such a way that each friction liner is fixed to one of the elements, consisting of the piston and the transverse wall, between which it is arranged to be gripped.

It is of course possible to reverse the structure of the coupling 13, with the disc 10 then having mortices in which tenons of the guide ring 12 are engaged.

In a modified version, the disc 10 may be coupled through a coupling of the tenon and mortice type to a crown which is attached on the turbine wheel 4. In that case, the disc 10 is coupled rigidly to the turbine wheel 4.

The seal 29 may be carried by the piston 9, and more precisely by the sleeve of the latter. The torsion damper 23 may have a different form, for example that which is described in the U.S. Pat. No. 5,209,330.

As described for example in the document FR-A-27 34 037, it is of course possible to provide abutment means which face towards the transverse wall 2 and which are carried by one of the components consisting of the transverse wall 2 and the guide ring 6, in order to limit the movement of the piston 9 away from the transverse wall 2.

These abutment means may be fitted outside the variable volume chamber, and may for example consist of an annular member fixed to the guide ring, and more precisely to the dorsal face of the guide ring 6 that faces away from the transverse wall.

In another version, these abutment means may be fitted inside the said variable volume chamber and be formed by press forming in the lugs 48 which are offset axially with respect to the main portion of the inner driving member 44.

The positioning of the member 44 can of course be different, for example using a removable centering piece which acts between the inner periphery of the wall 3 and the outer periphery of the member 44.

In another modified version, the transverse wall 2 can be machined so as to form annular surfaces which, for example, enable the outer periphery of the member 44 to be centred with respect to the wall 2.

In a further version, welding by transparency can be carried out on the other side of the transverse wall 2, to extend partially into the thickness of the said wall and entirely through the wall of the driving ring.

Preferably the components to be welded are rotated with respect to the laser.

What is claimed is:

1. A hydrokinetic coupling apparatus for a motor vehicle, comprising a generally transversely oriented wall (2) which is adapted to be coupled in rotation to a driving shaft and which carries a guide ring (6) fixed centrally thereto, a piston (9) mounted sealingly for axial movement along the guide ring (6) and defining, with the ring (6) and the transverse wall (2), a variable volume chamber (30) which is bounded on the outside by a disc (10), and friction liners (11) which are adapted to be gripped respectively between the piston (9) and the disc (10), and between the disc (10), and the transverse wall (2), each friction liner (11) being fixed to one of the elements, including the disc (10), the piston (9) and the transverse wall (2), between which it is adapted to be gripped, wherein the piston (9) is coupled in rotation to the transverse wall (2), with axial mobility, by means of interposed tangential resilient tongues (40) fixed to a driving member (44), wherein the driving member (44) for the tongues (40) is fixed by laser transparency welding to the transverse wall (2), and the driving member (44) is included in advance in a sub-assembly which also comprises the tangential tongues (40) and the piston (9).

2. Apparatus according to claim 1, wherein the welding is of a transparency type performed with a laser and producing a continuous weld band (45).

3. Apparatus according to claim 1, wherein the driving member (44) is positioned in advance, before welding, with the aid of a jig having a removable centering piece, centering the piston (9).

4. Apparatus according to claim 3, wherein the centering piece is engaged in a central sleeve (50) of the transverse wall (2) for fitting of the guide ring (6).

5. Apparatus according to claim 1, wherein the laser transparency welding operation is performed from an opposite side of the transverse wall (2) from the piston (9).

* * * * *